United States Patent [19]
Rodgers

[11] Patent Number: 5,422,628
[45] Date of Patent: * Jun. 6, 1995

[54] REED SWITCH ACTUATED CIRCUIT

[76] Inventor: Nicholas A. Rodgers, C/o: Shaw & Co. SJO 892, P.O. Box 025216, Miami, Fla. 33102

[*] Notice: The portion of the term of this patent subsequent to Aug. 30, 2011 has been disclaimed.

[21] Appl. No.: 160,185

[22] Filed: Dec. 2, 1993

Related U.S. Application Data

[63] Continuation-in-part of Ser. No. 944,923, Sep. 15, 1992, Pat. No. 5,343,190.

[51] Int. Cl.$^6$ .............. G08B 23/00; A43B 23/00; H01H 35/02
[52] U.S. Cl. .............. 340/573; 36/137; 36/139; 200/61.45 R; 335/206; 362/103; 446/26; 446/130
[58] Field of Search .............. 340/573, 689, 323 R, 340/326, 331–332, 626; 36/137, 139; 362/103; 446/26, 129–130, 71, 81; 335/205–207; 200/61.45 R, 61.45 M, 61.48; 455/100; 235/105; 331/64–65

[56] References Cited

U.S. PATENT DOCUMENTS

| | | | |
|---|---|---|---|
| 3,618,059 | 11/1971 | Allen | 340/539 |
| 3,859,651 | 1/1975 | Thomas, Jr. | 340/689 X |
| 3,960,376 | 6/1976 | Berlin | 273/449 |
| 4,264,899 | 4/1981 | Menzies et al. | 340/689 X |
| 4,298,910 | 11/1981 | Price | 362/35 |
| 4,339,747 | 7/1982 | Maybee | 335/207 X |
| 4,350,853 | 9/1982 | Ganyard | 335/205 X |
| 4,588,387 | 5/1986 | Swanson | 446/130 |
| 4,737,774 | 4/1988 | Chapman et al. | 340/573 |
| 4,771,394 | 9/1988 | Cavanagh | 340/323 R X |
| 4,848,009 | 7/1989 | Rodgers | 36/137 |
| 5,343,190 | 8/1994 | Rodgers | 340/573 |

FOREIGN PATENT DOCUMENTS 0335467 4/1989 European Pat. Off. .............. 36/139

Primary Examiner—John K. Peng
Assistant Examiner—Thomas J. Mullen, Jr.
Attorney, Agent, or Firm—Dowell & Dowell

[57] ABSTRACT

An movable article carries a circuit including a normally OFF reed switch. In the ON state of the switch, the circuit is adapted to emit an audible or a visible signal. A magnet, mounted on the article to move during normal movement moves over a designed locus which include positions which will cause the reed switch to be ON and OFF.

5 Claims, 8 Drawing Sheets

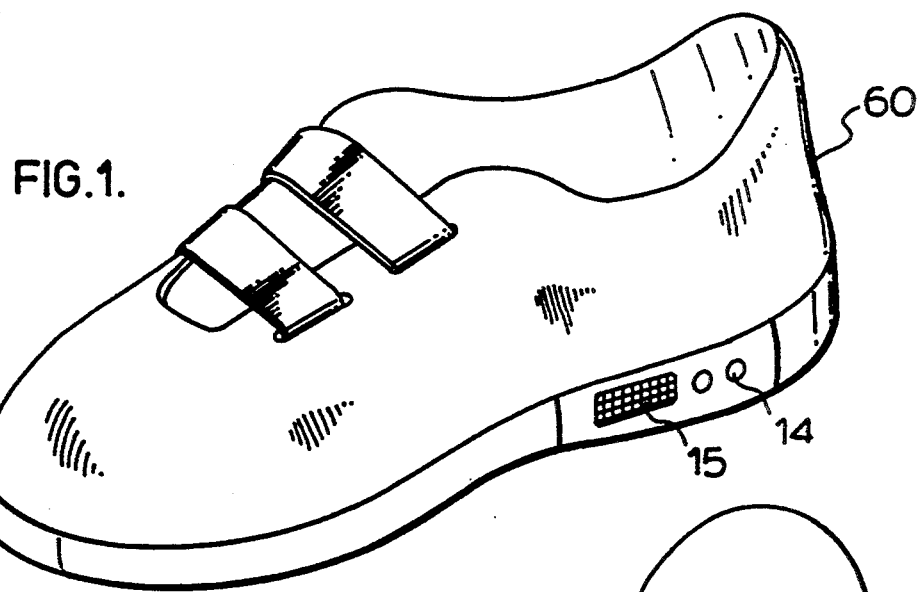
FIG.1.
FIG.2.
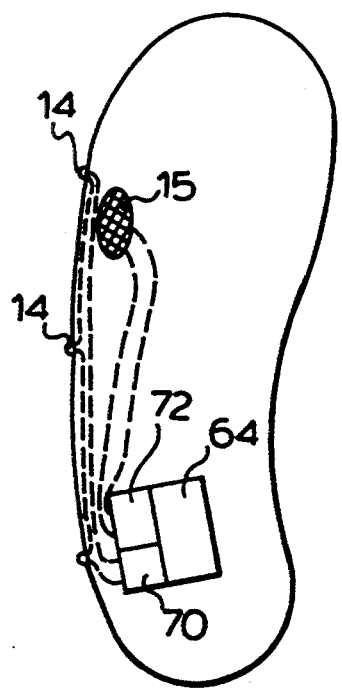
FIG.4.
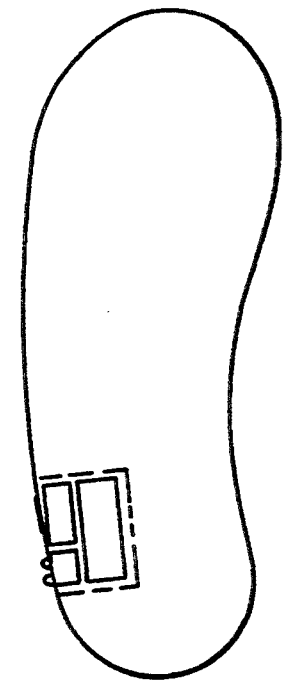
FIG.3.
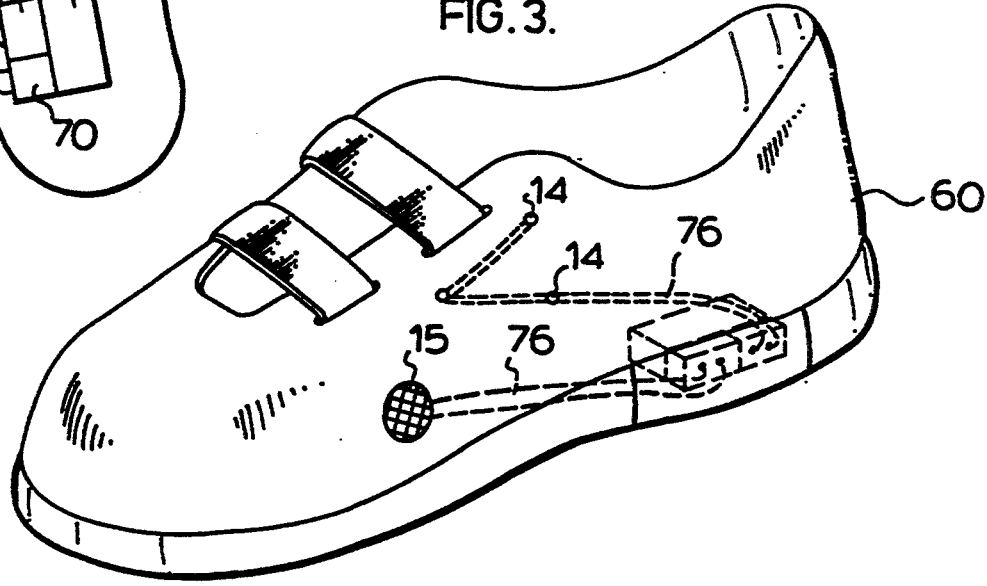

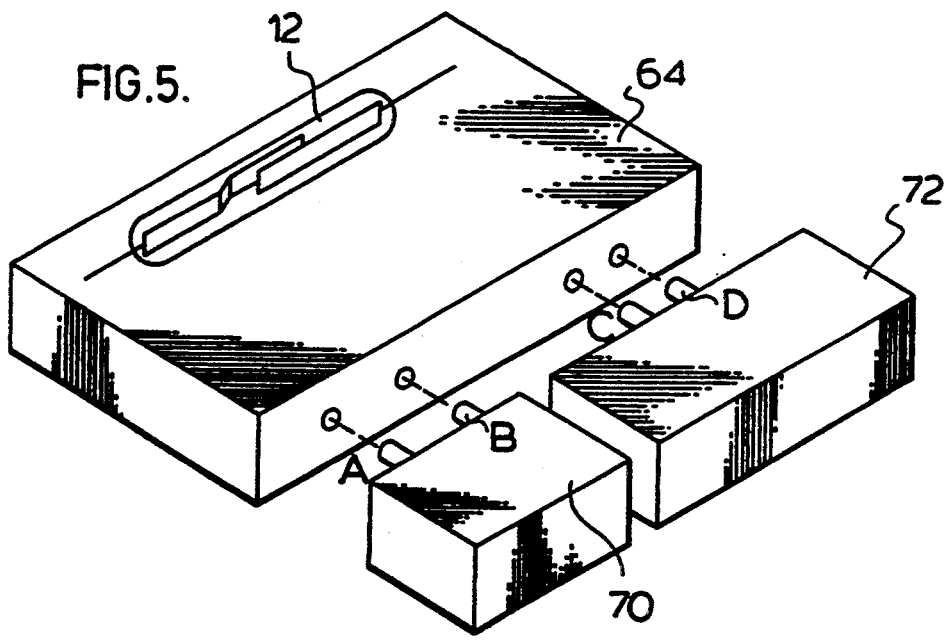
FIG.5.
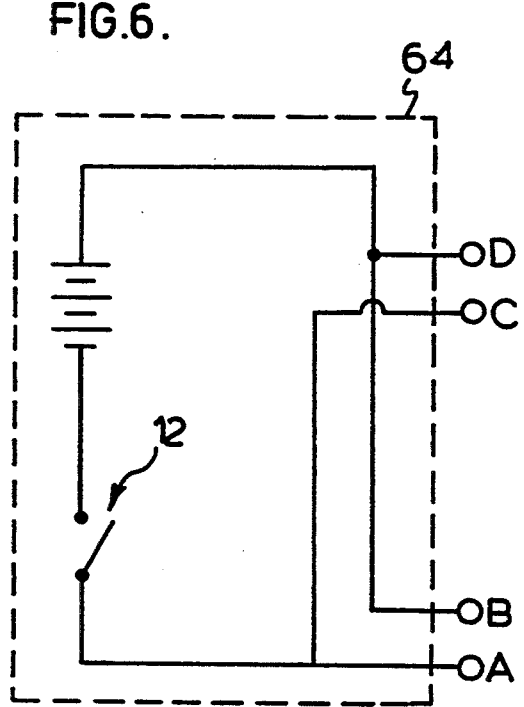
FIG.6.
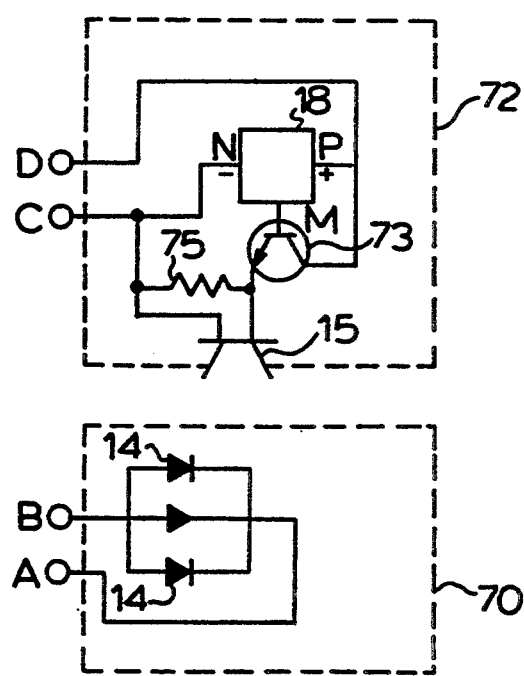
FIG.8
FIG.7.

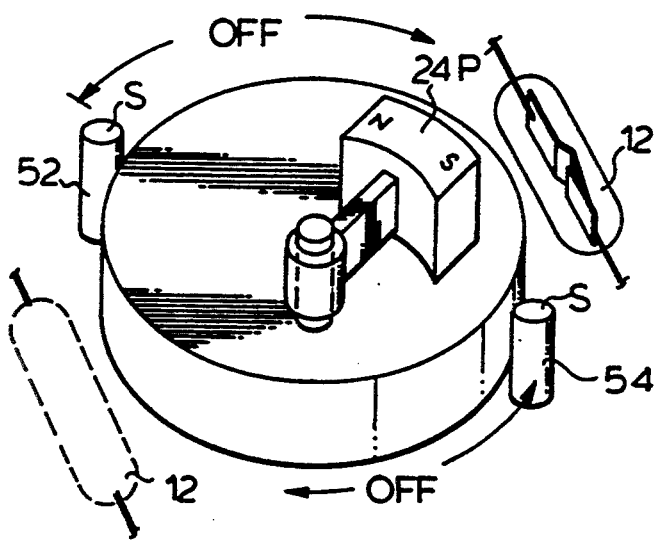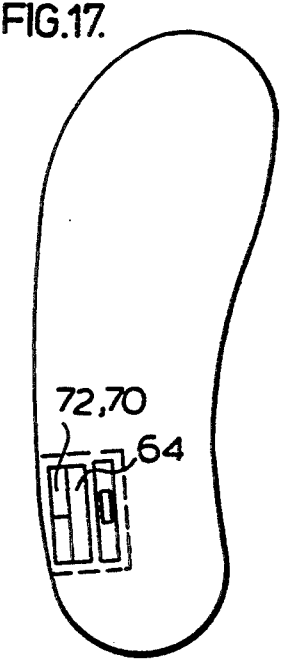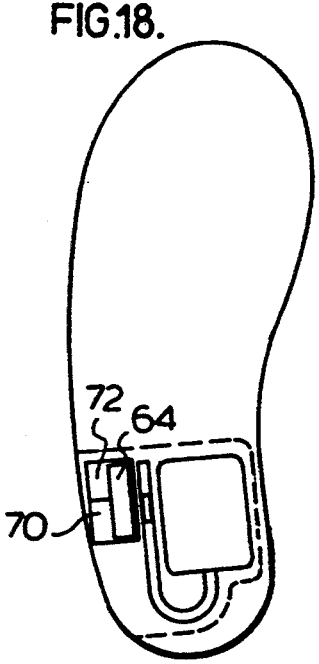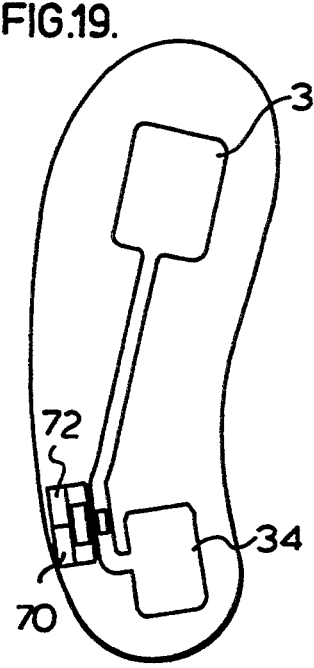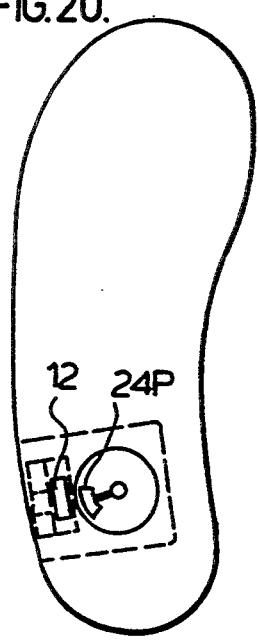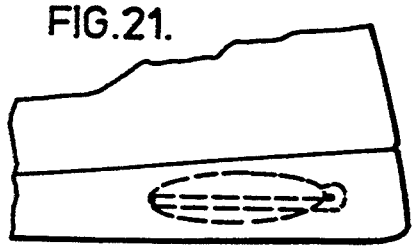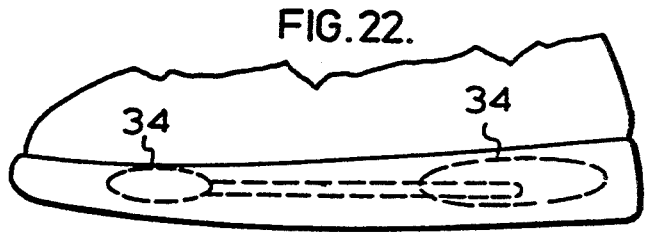

REED SWITCH ACTUATED CIRCUIT

CROSS REFERENCES TO RELATED APPLICATIONS

This application is a continuation-in-part of application Ser. No. 07/944,923 filed Sep. 15, 1992 now U.S. Pat. No. 5,343,190.

BACKGROUND OF THE INVENTION

This invention relates to articles and circuits designed for mounting thereon, adapted to give an exterior sensible signal when in use.

By exterior sensible signal is meant either (a) a visual signal created by an exteriorly visible light emitting diode (LED), light bulb or other light source; or (b) an audible signal. The term sensible signal means that such signal is sensible to someone near the user or wearer of the article.

It is known to provide circuitry for installation in an article wherein the motion of the circuit while walking causes a light source to be switched on, see for example: U.S. Pat. Nos. 4,350,853 to Ganyard and 4,848,009 to Rodgers. Such a light source must be battery powered and preferably, to avoid undue battery wear and/or battery replacement, means must be provided to ensure that the light is turned off when the circuit is not in use.

There are a wide range of articles which may be combined with the circuit to be described in accord with the invention, to provide visual or audible emanation for amusement, novelty or other purposes. Articles suitable for such application are those which are normally moved in use, whether such normal motion is translation, rotation, flexure, tension or compression. Examples of such articles adapted for use in accord with the invention are: footwear, clothing, pet collars, fishing lures, childrens toys.

SUMMARY OF THE INVENTION

In accord with this invention there is provided an article of a type which is moved in use, containing a series circuit comprising: a battery, at least one normally open reed switch and at least one sensible signalling means. The sensible signalling means may either be a light source visible exterior to the footwear or an audio source audible exterior to the article. A magnet is provided moveable between at least one ON and at least one OFF positions, and preferably adapted to be biassed to an OFF position. In an ON position the magnet is located to close the reed switch and in an OFF position to open it. The magnet is preferably biassed to an OFF position to save undue battery wear. When the reed switch is closed the sensible signal is activated, when the reed switch is open, it is not.

A particular advantage of reed switches over other switches is that they may be remotely actuated. Thus the reed switch and connected circuitry may be located in a control module while the actuator for the switch may be outside the module.

There may be a plurality of reed switches, each individually corresponding to an ON position, thus there may be more than one signalling means, each one activated by one of the reed switches. Alternatively multiple signalling means may be operated by a single reed switch. Although one reed switch may be open when another is closed there must be an OFF position where all signalling means are extinguished and the magnet should be biassed to this OFF position in order to save battery power.

In one preferred aspect of the invention, the signalling means is a light source (preferably an LED) and in an alternate aspect the signalling means is a sound source.

Whether the light or sound source is used the magnet mount must allow the magnet to move between one or more ON positions, on the one hand, and an OFF position, on the other hand, and preferably be biassed toward the OFF position.

It will be noted that if other means of extinguishing the signal means is provided, the bias of the magnet to OFF position is not as important.

In one preferred aspect of the invention the magnet is allowed to move in a locus of movement including the OFF position and at least one ON position.

In a preferred variant of the form of the invention in the previous paragraph the magnet is inertially moveable along a bore over a locus including an OFF position and at least one ON position and is spring biassed to OFF position.

In an alternative to the variant of the previous paragraph, the magnet is inertially movable along a bore over a locus involving an OFF position and at least one ON position and is magnetically biassed to OFF position.

With either the spring or magnetic biasing described above, two springs or two magnets may be used to bias the switching magnet to a central OFF position between two ON positions adjacent opposite ends of the locus of movement.

In a further alternative of the invention the magnet may be spring or magnet biassed toward OFF position and the magnet may be shaped to ride as a floating piston in a bore which acts like a piston cylinder. Bladders in the shoe containing gas or liquid may be located at one or both ends of the bore to be compressed and expanded by the normal flexures of walking to move the magnet between an OFF position and one or two ON positions.

BRIEF DESCRIPTION OF THE DRAWINGS

In the drawings:

FIG. 1 is a perspective view of a shoe showing both visible and audible signalling means, FIG. 2 is a schematic top view of FIG. 1, showing the disposition of the signalling means, FIG. 3 is a perspective view of a shoe showing both visible and audible signalling means in an alternate disposition to that of FIG. 1, FIG. 4 is a schematic top view of the shoe of FIG. 3, showing the disposition of the signalling means, FIG. 5 is a schematic perspective view of the signalling and control modules associated with the arrangement of FIG. 1, FIG. 6 is a schematic wiring diagram of the control module of FIG. 5, FIG. 7 is a schematic wiring diagram of the light module of FIG. 5, FIG. 8 is a schematic wiring diagram of the sound module of FIG. 5, FIG. 16 shows a rotary driven magnet for use in controlling a reed switch, FIG. 17 schematically indicates the heel of a shoe with a linearly slidable magnet therein, FIG. 18 schematically indicates the heel of a shoe with an air driven magnet and a single air bladder, FIG. 19 schematically indicates the heel and sole of a shoe with an air driven magnet and double air bladders, FIG. 20 schematically indicates the heel of a shoe with a rotatably mounted magnet therein, FIG. 21 is a side view of the heel of FIG. 18 with the single bladder therein, FIG. 22 is a side view of the sole and heel of a shoe with the double bladder of FIG. 19.

DESCRIPTION OF THE PREFERRED EMBODIMENT

Although the examples of FIGS. 1–23 show shoes emitting both visible and audible indications, shoes in accord with the invention, will frequently be designed to provide only light, or only sound signals.

Figure 25:
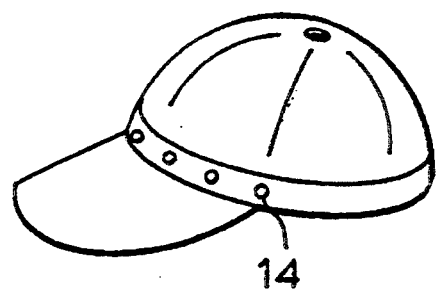
Figure 26:
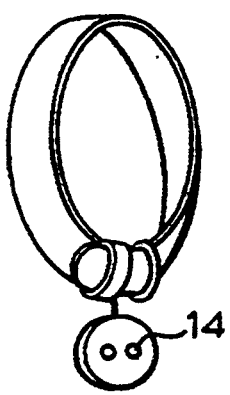
Figure 27:
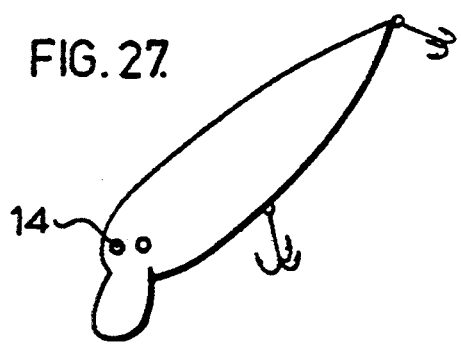

The examples of FIGS. 25–27 show articles emitting light signals only. However it will be obvious after reading the description to follow that these and other articles may be designed to emit a sound or to emit both sound and light.

An 'Actuator' herein is the component designed to control the state of the reed switch. Various actuators are shown in FIGS. 9–22 inclusive.

Figure 9:
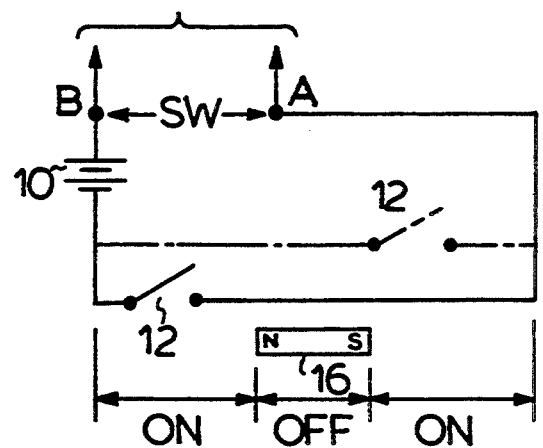
FIG. 9 is a schematic view of the operation of a movable magnet and reed switch to determine the operation of a light emitting diode (LED)

FIG. 9 shows the basic circuitry for a control module using LED's having battery 10 connected in series with one or more normally open reed switches 12 (which are themselves connected in parallel) and one or more LED's 14 (shown in FIG. 7). The LED's are shown connected across terminals at jack elements A,B to illustrate that the LED's may, if desired, be part of a separate plug-in module (see also FIG. 5) for the circuit. Movement of magnet 16 aligned as shown, into proximity with a reed switch closes the reed switch while movement of magnet 16 out of the immediate proximity of the reed switch causes it to assume its naturally open state. Thus in either ON position of the magnet 16 one of the reed switches 12 will be closed and the LED's will be on. In the OFF position both reed switches will be open and the LED's will be OFF.

Figure 10:
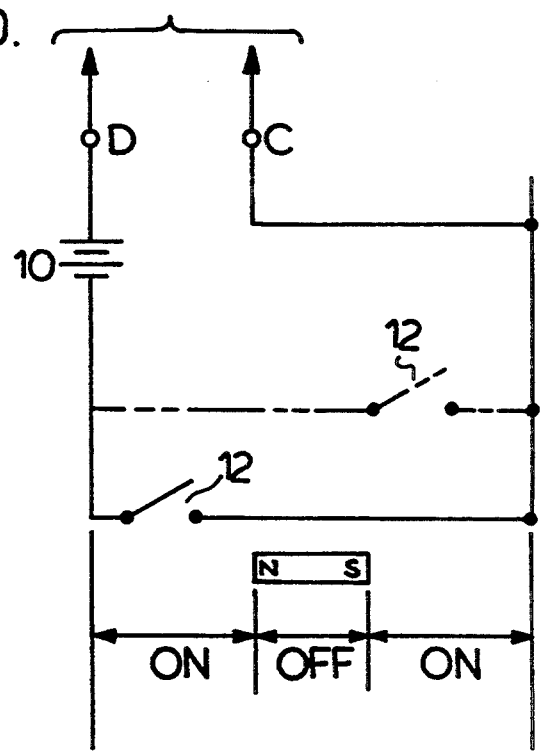
FIG. 10 is a schematic view of the operation of a movable magnet and reed switch to determine the operation of a sound synthesizer, FIG. 11 schematically demonstrates the action of a linearly movable spring biased magnet, on a reed switch.

FIG. 10 demonstrates the analogous circuit using a sound synthesizer 72 (see FIG. 8). The sound synthesizer has terminals C,D. (The sound synthesizer may use any suitable synthesizer integrated circuit ('IC' or 'chip' 18 but I prefer to use MC 68HCO5KO manufactured by Motorola). As shown in FIG. 10 the battery 10 is connected through one or more the reed switch(es) 12 connected in parallel. The connections may be made through jack elements at C,D if a plug-in module (see FIG. 5) is used. The magnet 16 is shown in the neutral or OFF position at which time all reed switches will be open. When under motion of or flexure of the shoe, depending on design criteria to be described hereafter, the magnet moves into an ON position in proximity to a reed switch, the corresponding reed switch will close and the closure of either reed switch connects the battery across the C,D terminals activating the sound synthesizer. The synthesizer may be programmed to make a variety of sounds at the choice of the programmer, for example 'choo' for a children's shoe.

Figure 11:
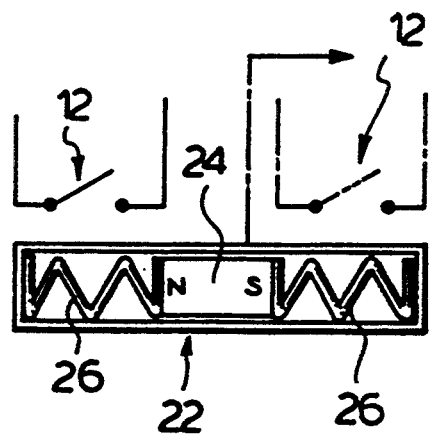
FIG. 11A shows an alternative construction to FIG. 11, FIG. 12 schematically demonstrates the action of a linearly movable magnetically biased magnet on a reed switch.

FIG. 11 schematically illustrates an actuator comprising a capsule 22 for embedment in a shoe containing a cylindrical magnet 24, which in this instance may be in either polarity. The magnet 24 is biassed toward a central or OFF position by opposed compression springs 26. Reed switches 12 for a circuit such as FIGS. 9 or 10 are located adjacent each end of the capsule 22 to be activated when the magnet moves toward such end (an ON position). Thus under the motion of walking or running, the magnet 16 moves intermittently toward one of the ends and actuates the proximate reed switch 12, to light the LED's 14 (FIG. 7) or activate the sound synthesizer 18, FIG. 8. When the motion of the shoes stops, the springs 26 move the magnet to OFF position turning off the visible or audible signal. If desired one reed switch 12 only may be used and only one spring 26 located to bias the spring toward an OFF position at the end of capsule 22 remote from the reed switch. In the actuator of FIG. 11, and its one spring alternative, the spring must be yielding enough to permit magnet travel to the ON position during walking.

Figure 11A:
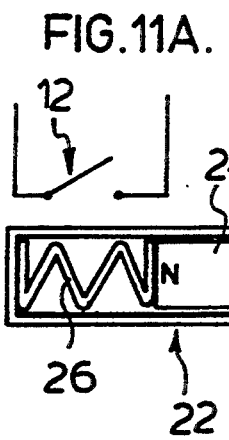

FIG. 11A shows an alternative construction wherein capsule 22 containing a single spring 26 biases the magnet 24 out of proximity with the single reed switch 12. Under the inertial forces of walking the magnet 24 may move leftward in tube 22 sufficiently to close the single reed switch 12 actuating a sound or light circuit, or both, during the interval ending when the spring 26 moves the magnet 24 out of effective proximity with reed switch 12.

Figure 12:
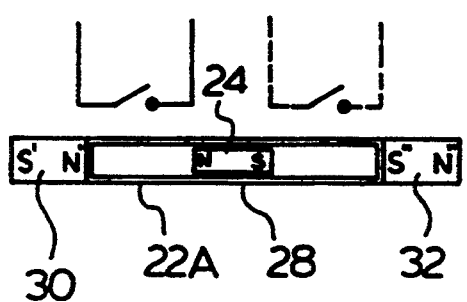
FIG. 12A shows an alternative construction of FIG. 12.

FIG. 12 shows a capsule 22A with a magnet 24 therein fixed in position at the end of capsule 22A biassed to the central OFF position by the bias magnets 30 and 32. Under the motion of walking or running the inertia of the magnet 24 will cause it to slide toward one end or the other of the capsule against a bias to reach an ON position and activate a reed switch 12 to cause the audible or visual signal as in the circuits of FIG. 9 or 10.

Figure 12A:
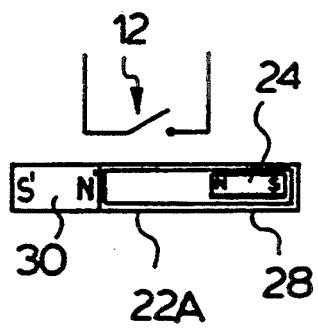

FIG. 12A shows an alternative construction wherein capsule 28 is associated with a single magnet 30 which biases magnet 24 out of proximity to the single reed switch 12. Under the inertial forces of walking the magnet 24 may move leftward in tube 22 sufficiently to close the single reed switch 12 actuating a sound or light circuit, or both, during the interval ending when the repulsion by the magnet 30 moves the magnet out of effective proximity to reed switch 12.

Figure 13:
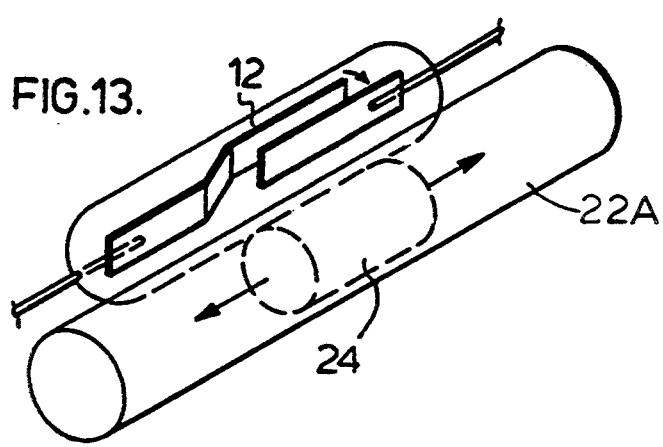
FIG. 13 is a perspective schematic view of a magnet and reed switch, FIG. 14 in section, illustrates the use of an air driven magnet with a reed switch.

FIG. 13 is a schematic indication of an actuator capsule 22A omitting the springs or bias magnets) a magnet 24 and a reed switch 12.

Figure 14A:
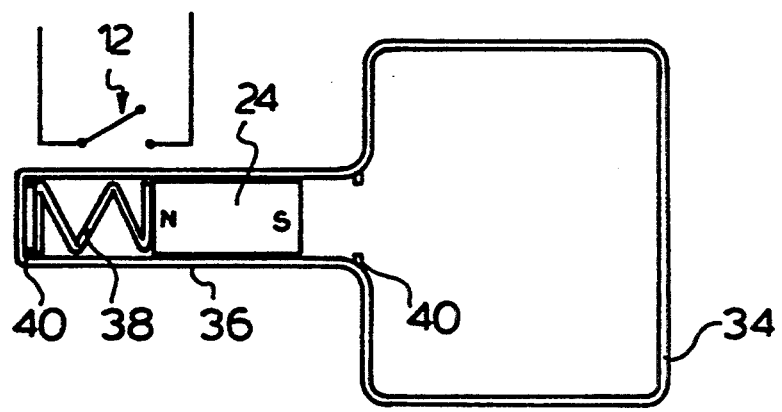
FIG. 14A shows an alternative construction to FIG. 14.
Figure 14:
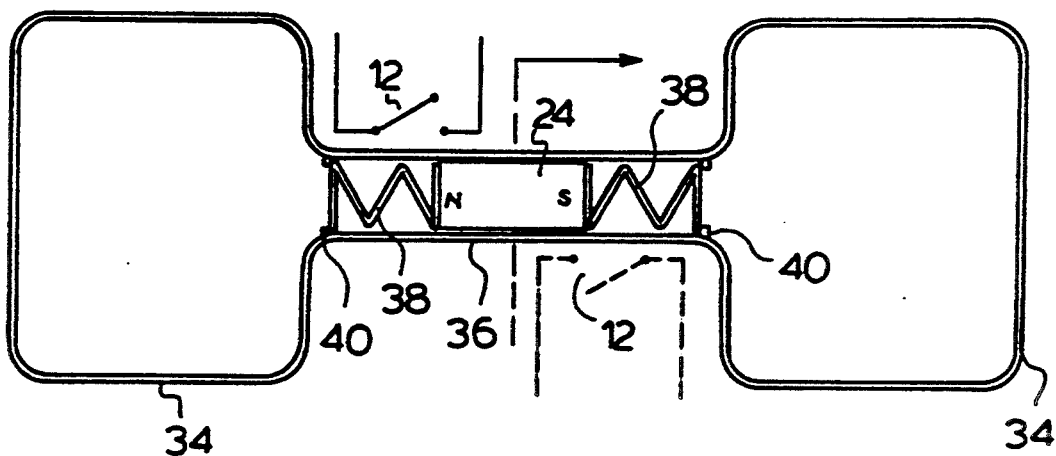
Figure 15:
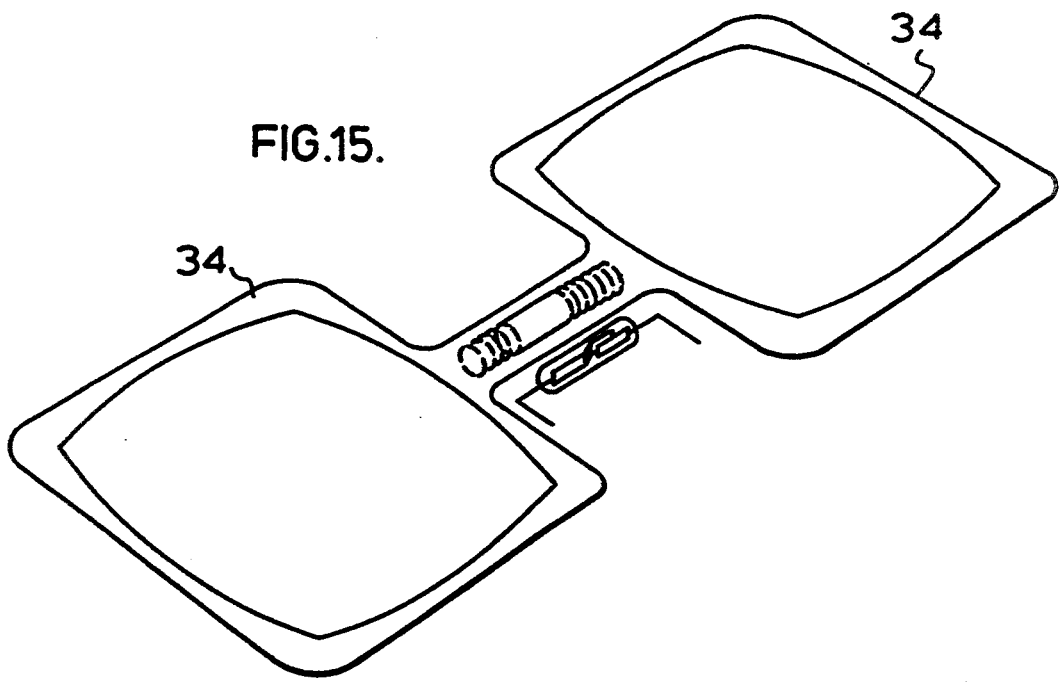
FIG. 15 shows, in perspective the use of an air driven magnet with a reed switch.

In FIGS. 14 and 15 a pair of bladders 34 is shown connected to a bore in cylinder 36 wherein a magnet 24 is shaped to act like a piston in a piston cylinder. Springs 38 bear on stops 40. In FIG. 14 the leftward or rightward movement of the magnet 24 is limited by bias springs 38 and the magnet 24. When the shoe is not flexed to compress one of the bladders 34 the springs drive the magnet 24 to a central location, that is to the OFF position away from either reed switch 12. Under the flexure of motion each bladder 34 volume is intermittently compressed and the air (or liquid) contents of the bladder move the magnet rightward or leftward to the ON position to close the reed switch and activate a visible or audible, signal in accord with the circuitry of FIGS. 9 or 10. As an alternative to the spring biassing in the alternative of FIGS. 14 and 15, magnetic biassing by analogy to FIG. 12 may be used. A single bladder and reed switch may be used. Similarly, as an alternative to the arrangement of FIG. 11, excursions of the magnet 24 may only be allowed in one direction and a single reed switch used.

FIG. 14A (see also FIG. 21) shows an alternative construction where cylinder 36 is connected to a single bladder 34 and, opposite the bladder, contains a single spring 38 biasing the magnet 24 out of effective proximity to the single reed switch 12. Under pressure from bladder 34 the magnet 24 may move leftward in cylinder 36 sufficiently to close the single reed switch 12 activating a sound or light circuit, or both, during the interval ending when spring 38 moves the magnet out of effective proximity to reed switch 12.

FIGS. 16 and 20 show an alternative means for controlling the reed switch. The magnet 24P is pivotally mounted like a flywheel with polarity as shown. Stationary bias magnets 52 and 54 are both designed to be polarized south toward the locus of magnet 24P with the rotating magnet polarity as shown. When the shoe is stationary, the north pole of rotatable magnet 24P is held over one of the stationary magnets and the rotating magnet is kept in or of two OFF positions remote from either reed switches 12, so that these are open and the circuit of either FIG. 1 or FIG. 2 is inactive. When the shoe is moving the magnet 24P rotates or oscillates through an arc, from time to time closing a reed switch 12 and actuating the circuit of FIG. 9 or 10 to produce the audible or visual signal.

When the motion of the shoe stops the rotating magnet 24P will come to rest in one of the OFF positions allowing the reed switch to open terminating the light and/or sound signal.

Instead of allowing the magnet 24P to travel through 360°, it may be constrained to oscillate through a small arc between an ON position and an OFF position, the latter determined by a magnet such as 54.

FIGS. 1–4 show a running shoe 60 with a cavity in the heel containing the control module 64 a light module 70 and sound module 72. The light module and the sound module may be used together or as alternates. FIG. 5 shows the control module having female connections for jack connections A,B,C and D, corresponding to those shown in FIGS. 6–10 and adapted to receive either the light module or the sound module or both. These may be plugged directly into the control module, as shown to be located in the heel, as indicated by FIGS. 1 and 2 or the light and sound output devices (LED's 14 or speaker 15) may be remotely located and connected by appropriate leads 76 as illustrated in FIGS. 3 and 4. Although such leads 76 may be wires moulded into the shoe I would prefer to use CAPTOR (TM) film circuitry a thin plastic film with the conductor 76 printed on it produced by Dupont Chemical Co. and sold under the trade mark PYRALUX.

In FIGS. 17–20 the actuator tube is located near the control module 64 with the reed switch inside module 64 and this is suitable for the inertial and spinning magnet application of FIGS. 9–14, and 16. However, the bladder operated actuator for the actuation of the device in FIGS. 14 & 15 must, as shown in FIGS. 14 and 15 be located in the sole or heel of the shoe as shown in FIGS. 18 and 19. FIG. 19 shows a double bladder 34 design as shown in FIGS. 14 and 15 and the physical disposition of the bladders 34 is indicated in FIG. 22. FIG. 18 shows a single bladder design, discussed previously and FIG. 21 shows its disposition in the heel of a shoe.

The operation of the control module 64 of FIG. 6 will be obvious. Responsive to movement of a permanent magnet 16 or 24 (not shown in FIG. 6) into suitable proximity to reed switch 12, the latter will close, connecting battery power across terminals A and B on the one hand and across terminals C and D on the other hand. In connection with the light module 70 it is obvious that the LED's will light as soon as power is connected across terminals A and B. In connection with module 72, sound synthesizer integrated circuit ('IC' or 'chip' 18 is, as stated, preferably that manufactured by Motorola under number MC68HC05K0. The positive lead from terminal D is connected to the positive terminal P of IC 18 and the negative lead is connected to negative IC terminal N. When Dower is applied across terminals P and N a modulated output from terminal M is applied to the base of transistor amplifier 73. (For the transistor amplifier I prefer to use model 9012). The amplified output is applied to the speaker 15 to produce the sound. The synthesizer will give a choice of sounds including a sound similar to the sound 'choo' for children's shoes. The resistance 75 is connected in parallel with the speaker 15 and typically has the value 303K$\Omega$. Other sound synthesizers with their own characteristic connections are within the scope of the invention. Thus any shoe may have a light module alone, a sound module alone or both. On closure of the reed switch due to movement of the magnet during walking, the connected module is activated and light sound or both are produced until the reed switch is opened.

Figure 23:
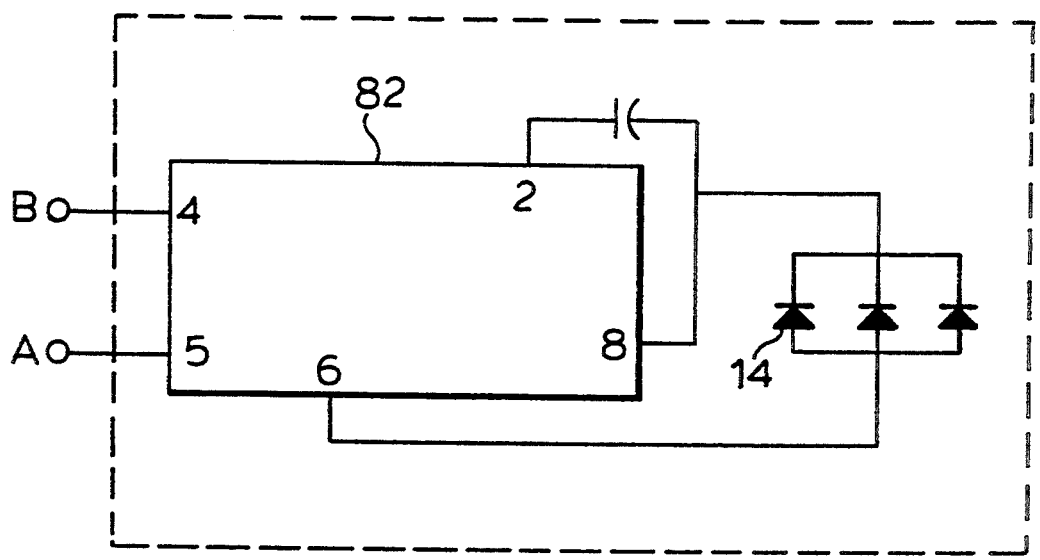
FIG. 23 illustrates a modification to the circuit of FIG. 7.

FIG. 23 shows a light circuit for use as an alternative to the light emission circuit of FIG. 7. The circuit of FIG. 23 interpolates, as shown, an oscillator 82 connected as shown between the battery outputs B and A and the LEDs. The oscillator will be designed when energized at terminals B and A, to illuminate LED's 14 at regular intervals, in accord with the designed frequency of the oscillator. Thus, while the relevant reed switch is maintained closed by its magnet in ON position, the LED's will be caused to flash regularly, the flashing ceasing when the magnet moves to OFF position releasing the reed switch.

Figure 24:
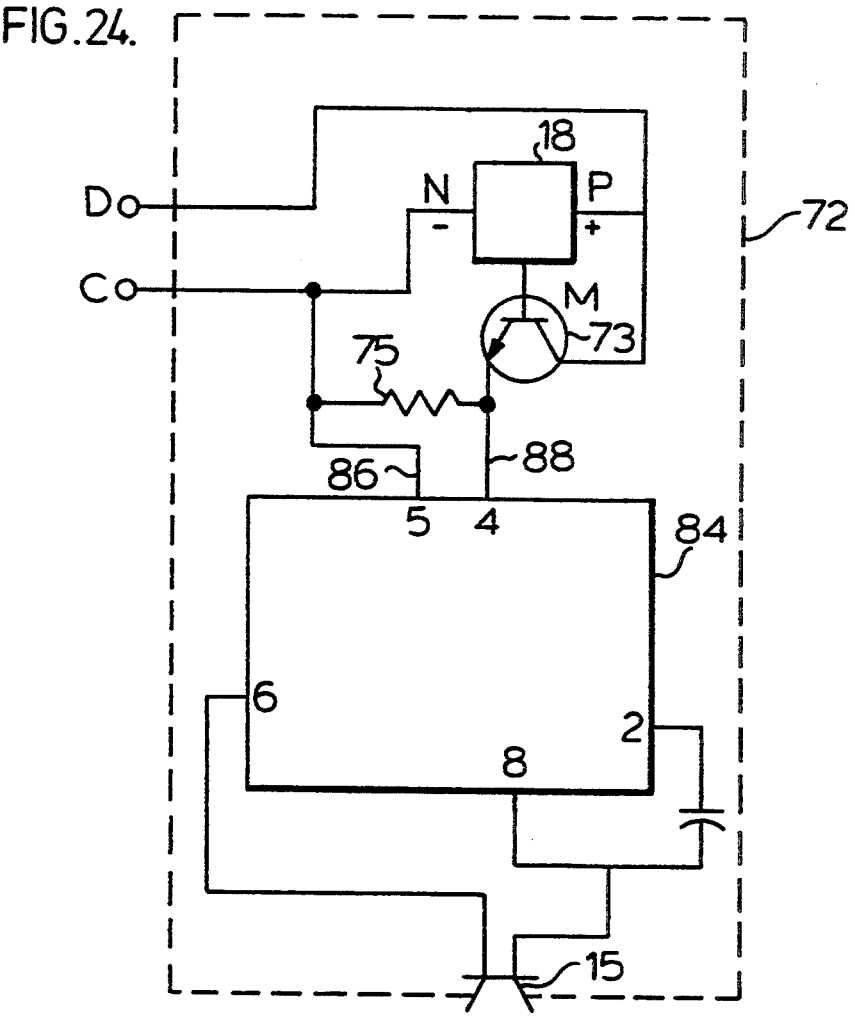
FIG. 24 illustrates a modification to the circuit of FIG. 8, FIGS. 25–29 are included to exemplify the very wide range of articles which may be combined with the inventive circuit in accord with the invention.

FIG. 24 shows a sound circuit for use as an alternative to the sound emission circuit of FIG. 8. The circuit of FIG. 24 interpolates, as shown, an oscillator 84 connected as shown, between the synthesizer chip output leads 86, 88 and the leads of speaker 15. The oscillator will be designed, when the sound model is energized at terminals D and C, to cause speaker 15 to give out the desired sound at regular intervals, in accord with the designed frequency of the oscillator. Thus, while the relevant reed switch is maintained closed by its magnet in ON position, the speaker will be caused to emit its sound signal regularly, the sound ceasing when the magnet moves to OFF position releasing the reed switch.

As previously stated the circuitry as shown in FIGS. 5–10, 23 and 24 with actuators as shown in FIG. 11–16 may be used to produce light or sound signals, or both in any articles which are in motion in normal use, whether such motion involves translation, rotation, flexure, tension or compression. Examples of such articles are shown in FIGS. 25–29. The cap of FIG. 25, dog collar of FIG. 26, fishing lure of FIG. 27 and sweater of FIG. 29 will typically be activated by translation or rotation and may (with the possible exception of the fishing lure,) be designed to emit sound in addition to or in lieu of lights from an LED. The doll of FIG. 28 may be similarly actuated although it is very suitable for bladder actuation by the devices of FIGS. 14, 14A and 15.

Figure 29:
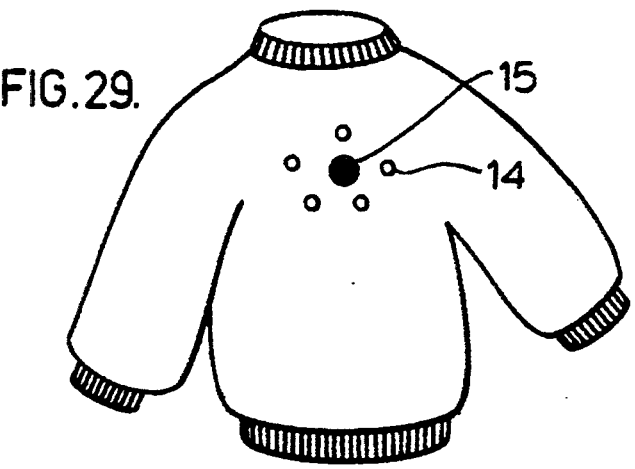
Figure 28:
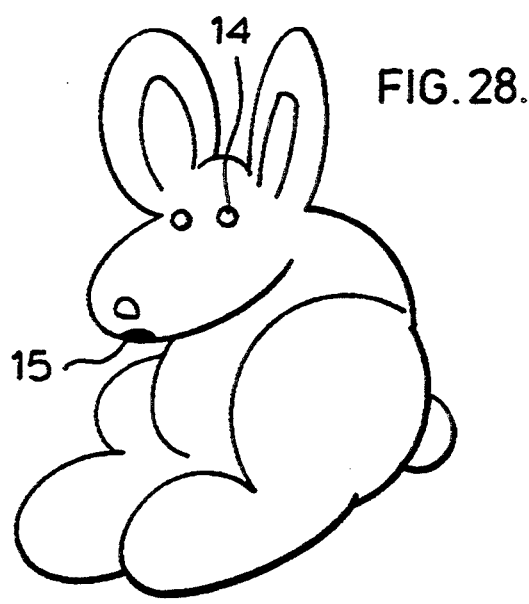

LED's 14 are identified on FIGS. 25–29 and a speaker 15 is indicated on FIGS. 28 and 29.

In all articles the actuator, attached circuitry and sensible means will be located and mounted in any manner suitable to the article in question.

I claim:

1. A flexible article comprising:
   a circuit comprising a normally open reed switch connected in series with a battery and with signalling means,
   said signalling means being adapted, on closure of said reed switch, to emit a signal exteriorly of said article,
   a permanent magnet mounted in said article to move relative to said reed switch between an ON position where said magnet closes said reed switch and an OFF position where said magnet allows said reed switch to open,
   wherein there is mounted on said article, a bladder opening into a cylindrical bore, wherein said magnet is shaped to act as a piston adapted to slide in said bore, said article further comprising means adapted to bias said magnet toward said bladder, wherein said bladder is designed to alternately expand and contract when said article is flexed and unflexed,
   wherein said magnet, which is under the influence of said biasing means and of the pressure existing within said bladder is adapted to assume said OFF position when said article is unflexed and to pass through said ON position when said article is flexed.

2. In combination, an article which is normally moved in use,
   a circuit mounted on said article comprising a normally open reed switch, connected in series with a battery and with signalling means,
   said signalling means being adapted, on closure of said reed switch, to emit a signal exteriorly of said article, and
   a permanent magnet mounted in said article to move relative to said reed switch under forces developed by the normal movement of said article, between an ON position where said magnet closes said reed switch and an OFF position where said magnet allows said reed switch to open,
   wherein said magnet is biased to assume said OFF position, and
   wherein said magnet is mounted in a bore and adapted to slide therein, and is spring biased toward said OFF position.

3. In combination: an article which is normally moved in use,
   a circuit mounted on said article comprising a normally open reed switch connected in series with a battery and with signalling means,
   said signalling means being adapted, on closure of said reed switch, to emit a signal exteriorly of said article, and
   a permanent magnet mounted in said article to move relative to said reed switch under forces developed by the normal movement of said article, between an ON position, where said magnet closes said reed switch and an OFF position where said magnet allows said reed switch to open,
   wherein said magnet is biased to assume said OFF position,
   wherein said article includes a bladder opening into a cylindrical bore, wherein said magnet is shaped to act as a piston adapted to slide in said bore, said article further comprising means adapted to bias said magnet toward said bladder, wherein said bladder is designed to alternately expand and contract when said article is flexed and unflexed, and
   wherein said magnet, which is under the influence of said biasing means and of the pressure existing within said bladder, is adapted to assume said OFF position when said article is unflexed and to pass through said ON position when said article is flexed.

4. An article which is normally moved in use having a magnet located therein,
   said magnet being mounted to be reciprocated between an ON position and an OFF position relative to a reed switch during motion of said article, by forces generated when said article is so normally moved,
   circuit means including a battery and said reed switch, located in said article,
   said reed switch being mounted to be closed and opened, when said magnet is in said ON position and said OFF position, respectively,
   said circuit means being connected, responsive to a closed state of said reed switch, to produce a sensible signal exterior to said article,
   wherein said magnet is biased to said OFF position, and
   wherein said magnet is mounted in a bore and adapted to slide therein.

5. An article which is normally moved in use having a magnet located therein,
   said magnet being mounted to be reciprocated between an ON position and an OFF position relative to a reed switch during motion of said article, by forces generated when said article is so normally moved,
   circuit means including a battery and said reed switch, located in said article,
   said reed switch being mounted to be closed and opened, when said magnet is in said ON position and said OFF position, respectively, said circuit means being connected, responsive to a closed state of said reed switch, to produce a sensible signal exterior to said article, wherein said magnet is biased to said OFF position, wherein said article includes a bladder opening into a cylindrical bore, wherein said magnet is shaped to act as a piston adapted to slide in said bore, said article further comprising means adapted to bias said magnet toward said bladder, wherein aid bladder is designed to alternatively expand and contract when said article is flexed and unflexed, and wherein said magnet, which is under the influence of said biassing means and of the pressure existing within said bladder, is adapted to assume said OFF position when said article is unflexed and to pass through said ON position when said article is flexed.

* * * * *